United States Patent Office 3,068,284
Patented Dec. 11, 1962

---

3,068,284
4-ALLYL-3,6-ENDOMETHYLENE-1-CYCLO-HEXENE-4-CARBOXAMIDE
Arne Elof Brandstrom, Goteborg N, Sweden, assignor to Aktiebolaget Hassle, Apotekare Paul Nordstroms Fabriker, Goteborg, Sweden, a company of Sweden
No Drawing. Filed May 31, 1961, Ser. No. 113,644
Claims priority, application Sweden June 2, 1960
1 Claim. (Cl. 260—557)

This invention relates to a composition of matter adapted for therapeutic use and, more particularly, to a composition having sedative and spasmolytic effect.

New drugs having pharmacological effect, particularly as sedatives and spasmolytic agents, are constantly being sought, particularly those having a relatively high therapeutic index, i.e., a high ratio of toxic dose to effective dose.

The compound which according to the present invention has been found to provide the desirable sedative and spasmolytic effect is 4-allyl-3,6-endomethylene-1-cyclohexene-4-carboxamide of the formula

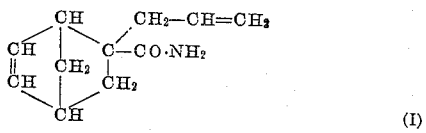
(I)

The compound of the Formula I has very valuable pharmacological properties. It has a strong sedative effect and at the same time a low toxicity. Even in high doses, the hypnotic effect is small. Moreover, this compound shows a relatively strong spasmolytic effect—similar to that of papaverin—and further it has been shown that small doses of the compound very strongly potentiate the action of soporifics of the barbiturate-type. For this reason, the compound is very suitable as a sedative agent at states of agitation, especially with spastic features. Its unexpected and very favorable combination of pharmacological properties makes the compound suitable as an ataractic agent.

The new compound may be prepared simply and in good yield by subjecting the corresponding nitrile of the formula

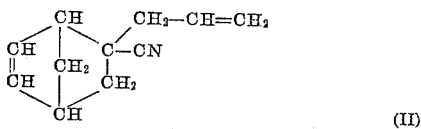
(II)

to alkaline hydrolysis. The nitrile of the Formula II may in turn be prepared in good yield from readily accessible starting materials by the following reactions:

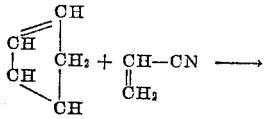

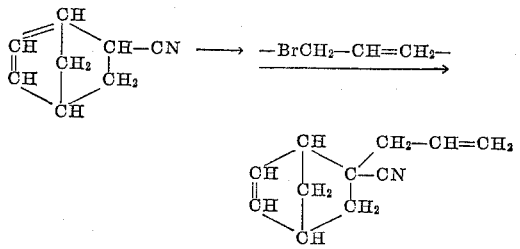

The hydrolysis of the nitrile group of the compound of the Formula II giving the compounds of the Formula I, which is carried out with alkali in a solvent has surprisingly been shown to stop at the carboxamide state, and the corresponding carboxylic acid is formed only in a negligible amount.

The invention is illustrated by the following example.

EXAMPLE

*4-Allyl-3,6-Endomethylene-1-Cyclohexene-4-Carboxamide*

39.0 grams of KOH, 136.0 grams of ethylene glycol, and 39.0 grams of 4-allyl-3,6-endomethylene-1-cyclohexene-4-carbonitrile were mixed and boiled with stirring for 1 hour. The mixture was cooled and poured out on 400 grams of ice and acidified with hydrochloric acid to a pH of about 2 and extracted with chloroform. The chloroform solution was washed two times with 125 ml. of saturated bicarbonate solution, dried with $Na_2SO_4$ and treated with some active carbon and evaporated in vacuum. The remainder, 32.0 grams, was boiled three times with 100 ml. of petroleum ether after which the remaining 24.0 grams were boiled six times with 200 ml. of $H_2O$. A residue of 6 grams of a tarry product remained. By cooling of the water solutions, 2.5 grams of the amide (B.P. 98–100° C.) was obtained.

The water solutions were collected and extracted three times with 100 ml. of chloroform. After evaporation of the chloroform in vacuum, 19.0 grams of the amide remained. Recrystallization from cyclohexene gave a pure amide having a boiling point of 98–99° C.

The invention may be otherwise variously embodied or carried out within the scope of the appended claim.

I claim:
4 - allyl - 3,6 - endomethylene - 1 - cyclohexene - 4 - carboxamide.

References Cited in the file of this patent
UNITED STATES PATENTS
2,942,026    Boehme et al. _____ June 21, 1960

OTHER REFERENCES
Yashunskii et al.: "Chemical Abstracts," vol. 50, page 14587C (1956).

UNITED STATES PATENT OFFICE
CERTIFICATE OF CORRECTION

Patent No. 3,068,284                              December 11, 1962

Arne Elof Brandstrom

It is hereby certified that error appears in the above numbered patent requiring correction and that the said Letters Patent should read as corrected below.

Column 1, lines 52 to 57, the formula should appear as shown below instead of as in the patent:

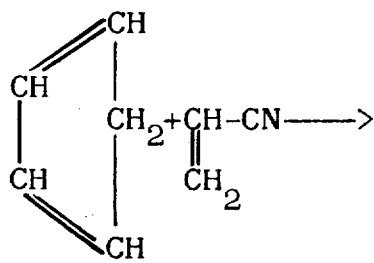

column 2, lines 1 to 5, the formula should appear as shown below instead of as in the patent:

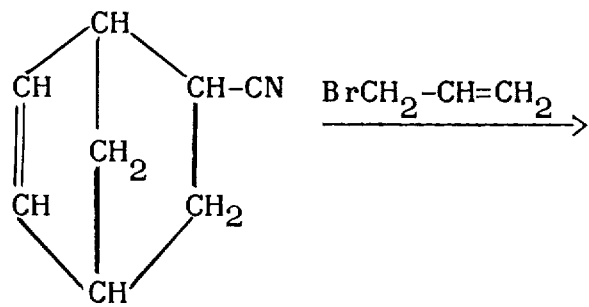

Signed and sealed this 29th day of October 1963.

(SEAL)
Attest:
ERNEST W. SWIDER
Attesting Officer

EDWIN L. REYNOLDS
Acting Commissioner of Patents